S. PATTON.
Corn Harvesters.
No. 138,181. Patented April 22, 1873.
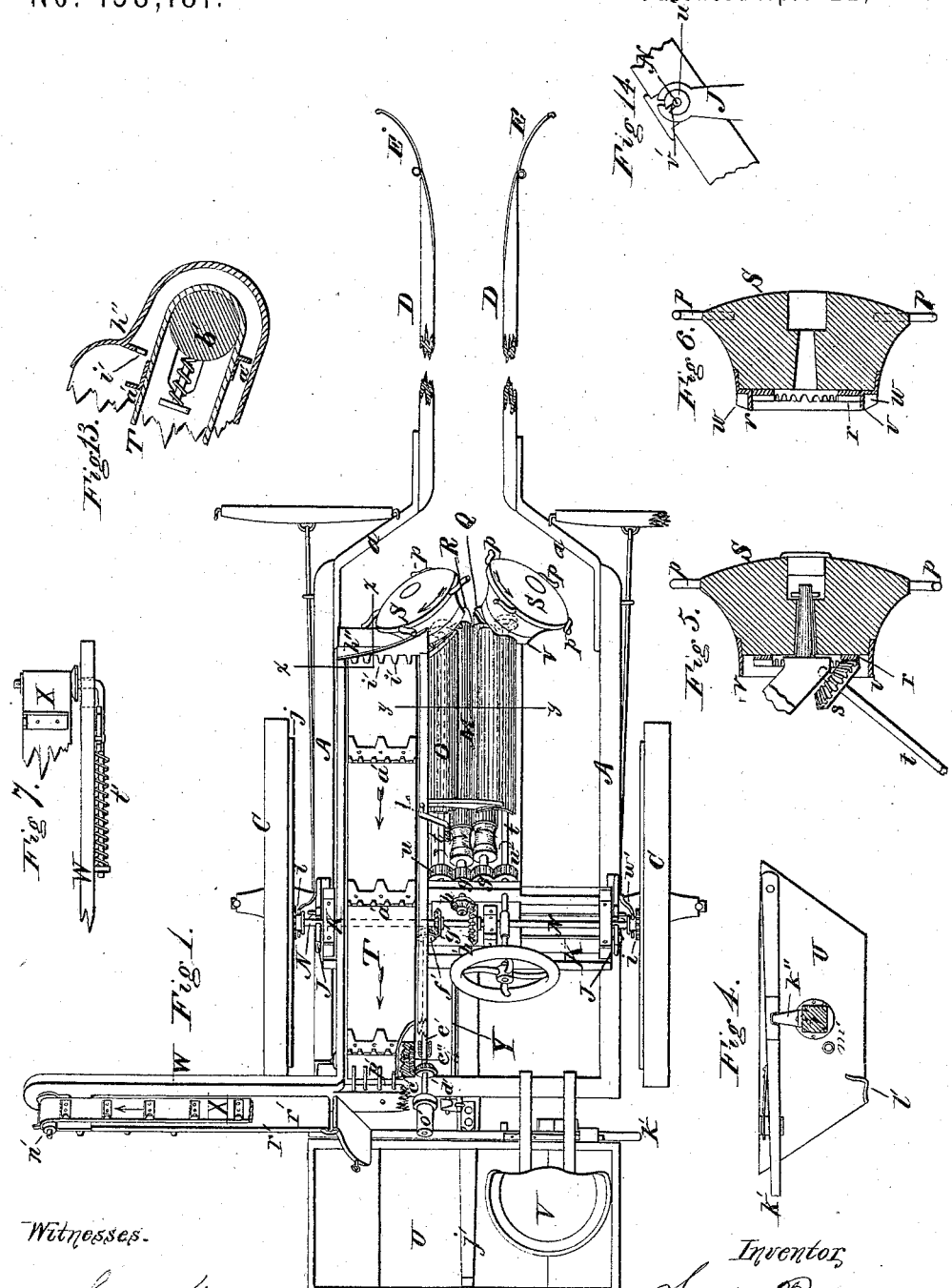
Witnesses:
Harry King.
Phil T. Dodge
Inventor:
Saml Patton.
by Dodge & Munn
Attys

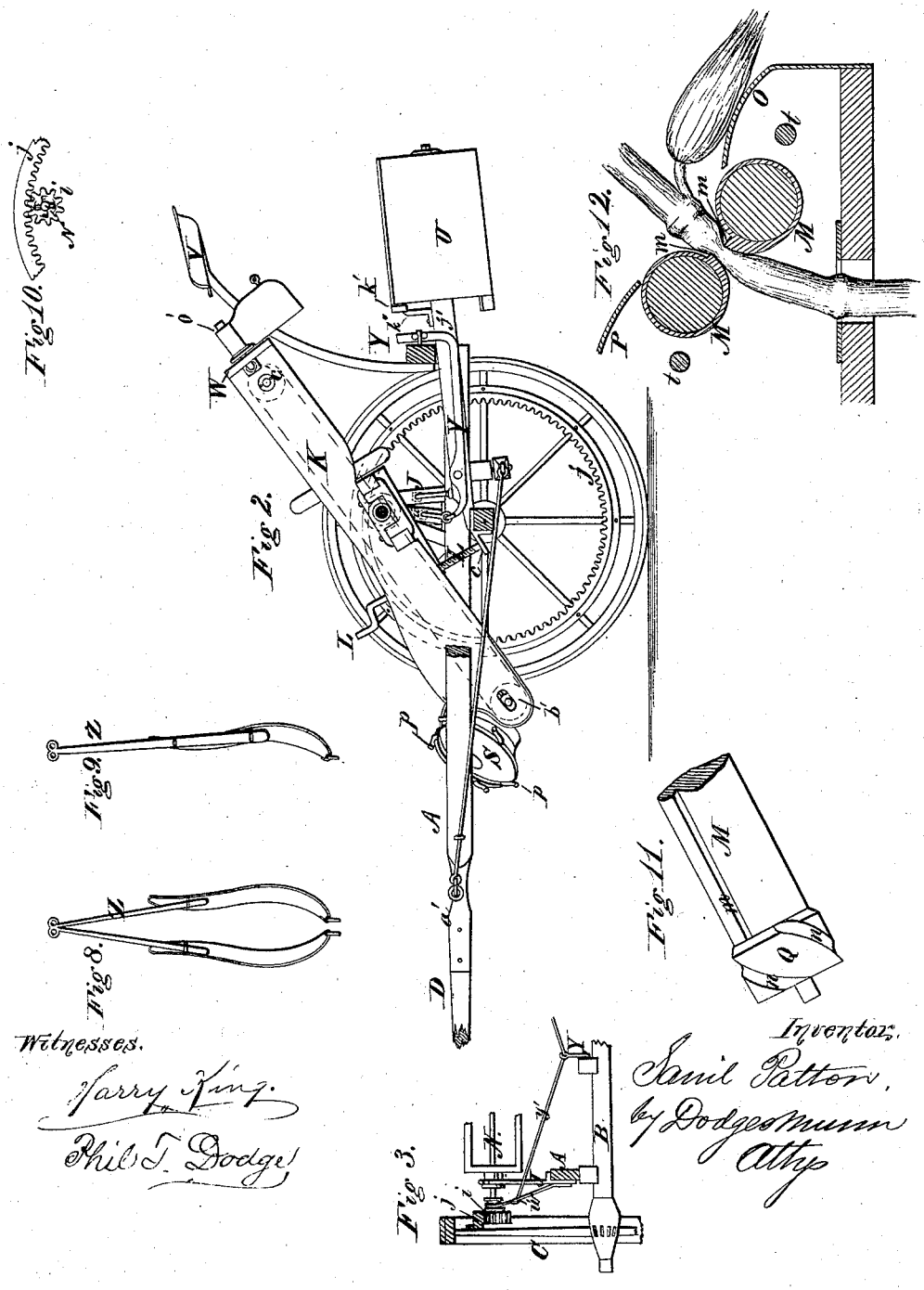

UNITED STATES PATENT OFFICE.

SAMUEL PATTON, OF CHATSWORTH, ILLINOIS.

IMPROVEMENT IN CORN-HARVESTERS.

Specification forming part of Letters Patent No. 138,181, dated April 22, 1873; application filed April 24, 1872.

*To all whom it may concern:*

Be it known that I, SAMUEL PATTON, of Chatsworth, in the county of Livingston and State of Illinois, have invented certain Improvements in Machines for Gathering and Husking Corn, of which the following is a specification, reference being had to the accompanying drawing.

My invention relates to certain improvements in the machine for which Letters Patent were granted to me May 24, 1870; and consists in providing the husking-rolls with lips of improved form, whereby they are caused to operate with certainty and without danger of shelling the corn; in an improved revolving head for feeding the stalks between the rolls; in gathering heads or reels having arms of peculiar form which seize the stalks without danger of removing the ears; in a novel manner of arranging the adjustable husking-frame and the driving-gear; and in various other details, as hereinafter fully described.

Figure 1 is a top-plan view of my machine; Fig. 2, a side elevation of the same with the wheel removed; Fig. 3, a vertical cross-section on the line $z\,z$; and Figs. 4 to 14, views of various details.

In the drawing, A represents a rectangular frame, with an open end, mounted in a horizontal position on an axle, B, which is supported by two large wheels, C, arranged to turn freely on its ends. The front open end of the frame is provided with two thills or shafts, D, which are attached to its sides by iron bars $a$, which bend inward, so as to bring the thills nearly together. In operating the machine I employ two horses, one outside of each thill, and drive them forward on opposite sides of a row of standing corn, so that the thills will straddle the row and guide the stalks into the husking mechanism, as hereinafter more fully explained. In order that all leaning and straggling stalks may be caught between the thills I provide their forward ends with hinged curved neck-yokes E, as shown. While answering all the purposes of ordinary neck-yokes, they also, at the same time, serve to carry the stalks inward between the thills and to prevent them from being trodden down by the horses. The whiffletrees for attaching the horses are secured to the front ends of sliding rods, which are mounted on the sides of the frame and have their rear ends attached to a pivoted cross-bar, which serves as an evener or equalizer to distribute the work evenly between the horses. In order to prevent the reins of the harness from catching on the corn-stalks the hames are provided with upright arms Z, as shown in Figs. 8 and 9, which have eyes in their upper ends to receive the reins and hold them above the corn. In case a harness is used having no hames, uprights may be attached to the thills D for the purpose of holding up the reins. On each side of the main frame A there is secured a standard, J, and to these standards there is pivoted an inclined frame, K, which carries the gathering and husking mechanism. The lower end of the frame K is provided with a hand-screw, L, which passes down through and bears on a plate, $c$, secured to the axle so that, by turning the screw, the inclination of the frame and the height of its lower end may be regulated at will. In the middle of the gathering-frame K there are mounted, side by side, two husking-rolls, M, which are provided on their upper ends with pinions $g$, gearing into each other. One of the rolls is also provided with a bevel-pinion, $h$, gearing into a pinion, $h'$, which is mounted on a transverse shaft, N, extending out through the pivots or journals of the frame, and provided on its ends with pinions $i$. The pinions $i$ gear into circular racks or cog-wheels $j$, which are secured to the inner sides of the main wheels C, so that, as the machine is drawn forward, motion is communicated through the gearing to the rolls M, so as to revolve them inward toward each other. The rolls are placed at such distance apart as to admit of the corn-stalks being drawn in between them, and to facilitate the entrance of the stalks, they are placed a little wider apart at their lower than at their upper ends. One of the rollers is placed a little higher than the other, as shown in Fig. 12, for a purpose hereinafter explained. Each of the rolls is provided its entire length with a lip or rib, $m$, one side of which rounds gradually outward, while the other is flat and extends out radially, as shown, so as to form a sharp edge where it meets the rounded side. The rolls are arranged with the flat sides of the lips outward, so that when they revolve toward each other, the rounded sides of the lips are on the inside, as shown. The lips of the form shown are peculiarly adapted for husking purposes, as their rounded or eccentric sides crowd upward under the butt ends of the ears, and enable the sharp edges to take a firm hold of the husk immediately at the end of the ear or cob. The lip of one roll is arranged slightly in advance of the lip on the other, as shown, so that in operation they will give the ears a tipping or oscillating motion, as hereinafter more fully described and explained. A plate or shield, O, is arranged above the lower roll, and curves down to one side, as shown in Fig. 12. A similar plate or shield, P, is also arranged over the upper roll, but is curved upward instead of downward, so as to prevent the ears of corn from being carried to that side. One of the rolls is provided, on its lower end, with a cylindrical head, Q, having a spiral groove, $n$, formed around its outside, to receive the stalks singly and draw them inward between the rolls. In order to cause the stalks to enter the spiral groove, the other roller should be provided with a conical head, R, which will force the stalks up against the head Q, so as to force them into the groove and prevent them from entering in bunches between the rollers. The grooved head, in addition to drawing the stalks in one at a time, serves to bend or incline them backward. For the purpose of gathering and holding the stalks until they are seized by the grooved head Q, two bell-shaped rotating heads or gatherers, S, are mounted in front of the rolls with their large ends forward, as shown in Fig. 1. These heads or gatherers are mounted, one at the end of each roll, on journals which extend outward, as shown, and they are provided, at their front ends with short arms $p$, which are curved backward, as shown in Fig. 1, the heads being so arranged that, as they rotate, the arms of one will enter midway between the arms of the other. The heads or gatherers are provided, on their inner ends, with pinions $r$, which are driven by pinions $s$ on the ends of shafts $t$, which extend up alongside of the rolls, and have pinions $u$ on their upper ends gearing into the pinions of the rolls so as to turn the gatherers in the opposite direction to that of the rolls. Each gatherer is provided on its inner end with a rim or flange, $v$, to prevent husks and other obstructions from working into the gearing; and one of them, the one at the end of the lower roll, is provided with ears or studs $w$, which sweep around opposite the end of the shield O, so that in case the ears of corn slide down against the gatherer, the studs will throw them outward. By the side of the lower roll there is mounted an inclined endless apron, T, extending up beyond the end of the frame K, and provided at short intervals with transverse rows of teeth $a'$, as shown in Figs. 1 and 2. The apron is carried by two rolls, $b'$ and $c'$, at its ends, the upper roll, $c'$, being provided with a pinion, $c''$, driven by a pinion, $d'$, on a shaft, $e'$, which shaft is provided at its lower end with a pinion, $f'$, gearing into a pinion, $g'$, on the main cross-shaft N, as shown in Fig. 1. In order to keep the apron T stretched tight, its lower supporting-roll $b'$ is mounted in sliding bearings which have springs placed above them, as shown in Fig. 13, so as to push the roller downward. Over the lower end of the apron there is placed a shield or receiver, $h''$, as shown in Figs. 1 and 13, so as to catch the corn and prevent it from falling off on the ground, the shield being provided with teeth $i'$, which extend down close to the belt so as to prevent the corn from sliding down through, and which are so arranged that the teeth $a'$ of the apron pass between them. A bar, $j'$, extends out from the rear end of the main frame A, and has pivoted upon it a box or receptacle, U, to receive the corn as it is carried up by the apron T. The pivot-bar $j'$ is provided with an upright arm, $k''$, as shown in Fig. 4, and the box with a notched spring-arm, $k'$, which locks over the end of arm $k''$ so as to hold the box in position. The seat V for the driver is mounted on the rear end of the frame A in such a position that he can raise the arm $k'$ with his toe, and thereby release the box, so that it can turn over and discharge its contents. The box is also provided with a toe-plate, $l'$, by bearing upon which the driver can bring the box back in position after it has been turned over the arm or latch $k'$, locking the box automatically as soon as it reaches its place. The pivot-bar $j'$ should be placed below or to one side of the center, so that the box will turn readily, and to prevent it from turning too far or upside down, it is provided with a stud, $m'$, which strikes against the stud $k''$ to limit the movement. To the upper end of the frame supporting the apron T there is secured an arm, W, extending out to one side of the machine, and provided at its end with a roller, $n'$, as shown in Fig. 1, and on the upper end of the shaft $e'$ there is a pulley, $o'$, and around the two there is passed an endless apron, X, which receives the corn from the apron T and carries it off to one side of the machine. This apron is only used when the corn is to be delivered into a wagon driven by the side of the machine or upon the ground instead of into the box U. When the corn is to be delivered into the box the apron X is removed.

A series of teeth, $p'$, are arranged at the upper end of the apron T, as shown in Fig. 1, so that the teeth of the apron pass down between them. The teeth thus arranged carry the corn from the end of the apron T over onto the apron X, and prevent it from falling down through, as it would otherwise do. The apron X is supported and prevented from sagging by a board, $r'$, secured to the side of the arm W, as shown in Fig. 1, the inner end of the board being hinged so that when the apron is not used it can be turned down out of the way, as shown, so as to let the corn pass over into the box. The roller for supporting the outer end of the apron X is mounted on the arm of a sliding bar, $t'$, which is pushed outward by a spring, as shown in Fig. 7, so as to keep the apron under the required tension. The journals $u'$ of the frame K, through which the main cross-shaft N passes, are each provided with a slot, $r'$, extending out through the side, and the standards are also provided with corresponding slots, as shown in Fig. 14, so that when the slots in the two parts are brought in line the shaft can be removed through them, the boxes or bearings on the frame being, of course, removed first. The pinions $i'$ of the shaft N are arranged so as to slide thereon, and are provided with teeth to engage with pins on its ends, as shown in Fig. 10, so that by sliding them inward they may be disengaged so as to turn loosely on the shaft. The pinions are held out in place by flat springs $w'$, which have their upper ends fitted into grooved necks on the pinions, as shown in Figs. 1 and 3. These springs have their upper ends connected by rods $y'$ with the inner end of a foot-lever, Y, which is pivoted to the middle of the frame, and extends back so that the driver can move it with his foot, and thereby throw the pinions out of gear and stop the motion of the parts.

In using the machine constructed as described, a horse is hitched outside of each thill and the reins passed up through the arms of the hames, shown in Figs. 8 and 9, and back to the driver who sits on his high seat V at the back of the machine. The horses are driven on opposite sides of a row of corn which passes inward between the two shafts, any stray stalks that may be out of line being caught and carried inward by the curved neck-yokes E. The stalks passing backward are caught by the rotating gatherers S, the arms of which draw the stalks inward in front of the rolls, and hold them until they are seized by the spirally-grooved head Q.

The bell-shape of the gatherers permits of a large number or cluster of stalks being held between them, while the backward curvature of their arms prevents them from catching firmly against the stalks and pressing them back too forcibly. Another object of curving the arms backward is to prevent them from breaking off the ears of corn that they may happen to come in contact with.

As many of the ears are easily broken off, great care should be taken not to interfere with them more than is absolutely necessary. For this reason the front ends of the gatherers are made convex, so that if the ears happen to lodge against them they will slide off easily over the rounded face; and the space between the gatherers is made wide enough to permit the free passage of the ears between them.

The arms of the lower gatherer bring the stalks into the proper position to be seized by the grooved head Q, which draws them inward between the rolls, one at a time. The rollers, revolving toward each other, draw the stalks of corn downward between them until the butt of an ear rests upon them, when the downward movement stops and the ribs or lips $m$ come around and grasp the husk between them, and give the ear a sudden oscillation, which breaks it from its stem, leaving the husks still on the stalks, so as to be drawn down through the rollers therewith.

In order that the lips or ribs of the rollers may be enabled to give the required oscillation to the ear to break it from its stem the rollers are arranged so that the lip of one is a little in advance of that of the other, as shown in Fig. 12, so that as the ear settles down on them it is caused to lean to one side, and then, when it comes in contact with the faces of the rolls, its motion is quickly reversed. The ear is generally broken from its stem by the first motion; but, when this does not happen, it is always broken by the second. The oscillation given to the ear may be increased by making the lip or rib of one roll, so as to project further than its fellow on the other roll; but this is not considered necessary.

After one ear is removed the stalk continues its downward motion, carries the empty husk down through, and brings the next ear down to be acted upon like the first, and so on until the whole stalk has been carried down through and all its ears removed. The spirally-grooved head Q, as it draws the stalks inward, also inclines them backward, causing them to pass backward between the rolls as they are carried down, thus continuously making room for the entrance of other stalks, so that the rolls can be operating upon a number of them at the same time. The stalks are assisted in retaining their inclined position by their friction against the frame under the rolls, as shown in Fig. 12.

By placing one of the rolls higher than the other, as shown and described, the stalks are caused to lean to one side, so that any ears which may be hanging down will rest on the plate O, which causes the point of the ear to rise as the stalk is drawn down, thereby turning the ear up in position so that the ribs or lips can take hold of the butt of the husk in order to remove the ear therefrom. By causing the hanging ears to rest on the rounded plate, as described, they are turned up in position gradually, and are prevented from being "snapped" or broken from the stalk before the lips take hold to remove the husk, as would be the case if they were suddenly turned up from a hanging position. The ears, as they are removed from the stalks, slide down over the plate O onto the apron T, which carries them upward. The shield or receiver $h'$ prevents them from being thrown off on the ground, and the lugs or ears $w$ on the lower gatherer S serve to throw them over onto the apron in case they slide down against the head. If the upper apron X is in use the corn is discharged onto it and carried by it off to one side of the machine; but if the apron is removed and the hinged end of the board $r'$ turned out of the way the corn will be discharged into the box or receptacle U. When the box becomes filled the driver raises the latch or bar $k'$ and allows it to turn over and discharge the corn, and then presses on the foot-piece $l'$ and brings it back in place again.

Thus it will be seen that by my method of construction I produce a machine which automatically gathers and husks the corn from the standing stalks and delivers it into a receptacle.

Having thus described my invention, what I claim is—

1. The husking-rolls M, when provided with the lips $m$ of the form shown and described, having abrupt shoulders on one side and of an elliptical curve on the other, and arranged to operate as set forth.

2. In combination with the husking-rolls, as above described, the spirally-grooved head Q, when arranged to work against or in close proximity to a smooth head, as shown, so as to separate the stalks and feed them between the rolls singly and at regular distances apart, as set forth.

3. The bell-shaped gathering-heads S, provided with the tangential arms P having the outwardly-curved ends, as and for the purpose set forth.

4. The pivoted gathering-frame K mounted on the main frame A, and provided with the transverse shaft N, said shaft being passed through the journals of the frame K, and provided on its ends with pinions $i$ gearing into teeth on the main wheels, as shown, so that the frame may be adjusted without affecting the gearing.

5. In combination with the husking-rolls and the elevating-apron T, the horizontal apron X for delivering the corn at the side of the machine, as set forth.

SAMUEL PATTON.

Witnesses:
GEORGE E. ESTY,
E. A. BANGS.